Dec. 21, 1954     R. H. SHIVELY     2,697,497
BRAKE ADJUSTING APPARATUS
Filed May 6, 1950     2 Sheets-Sheet 1
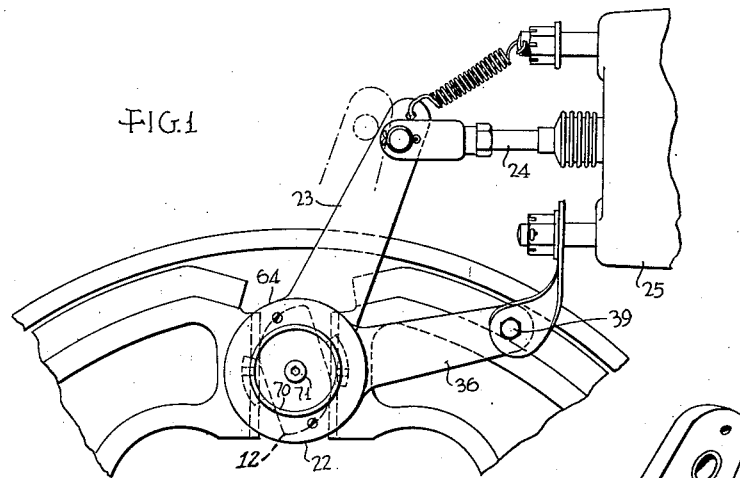
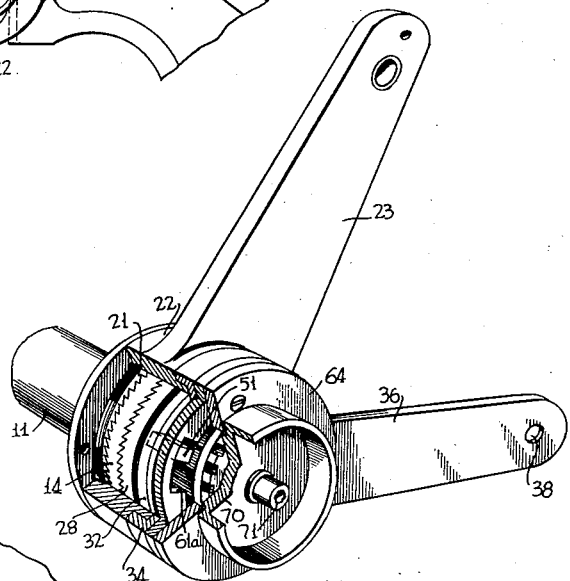
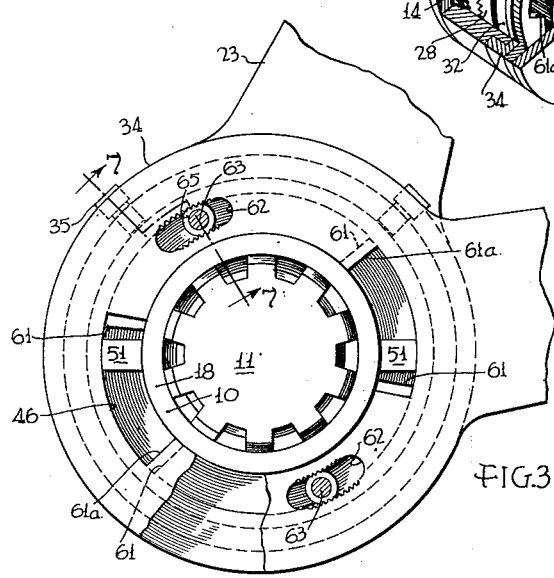
INVENTOR
Roy H. Shively Dec. 21, 1954   R. H. SHIVELY   2,697,497
BRAKE ADJUSTING APPARATUS
Filed May 6, 1950   2 Sheets-Sheet 2
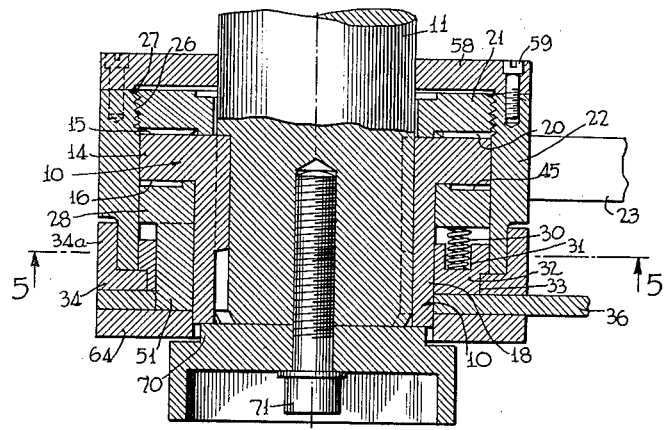
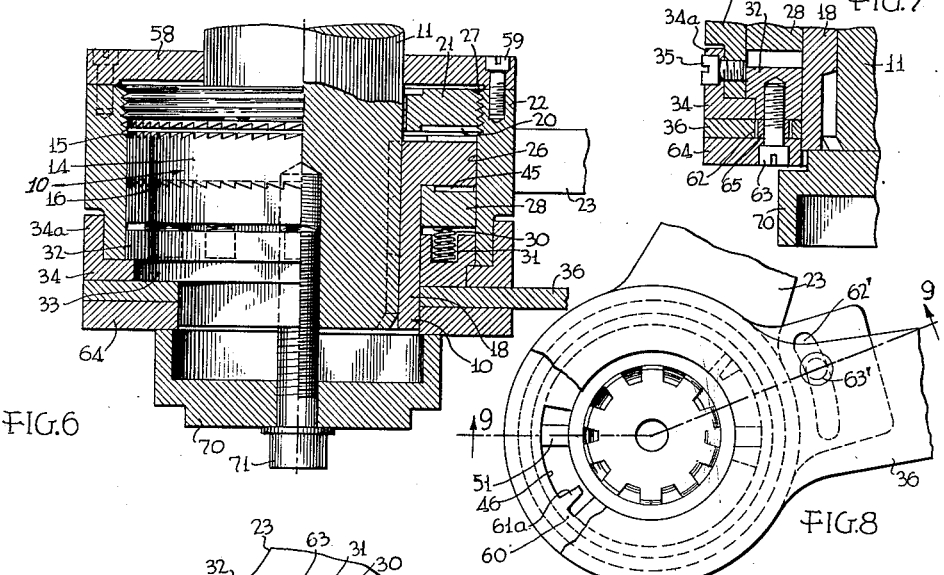
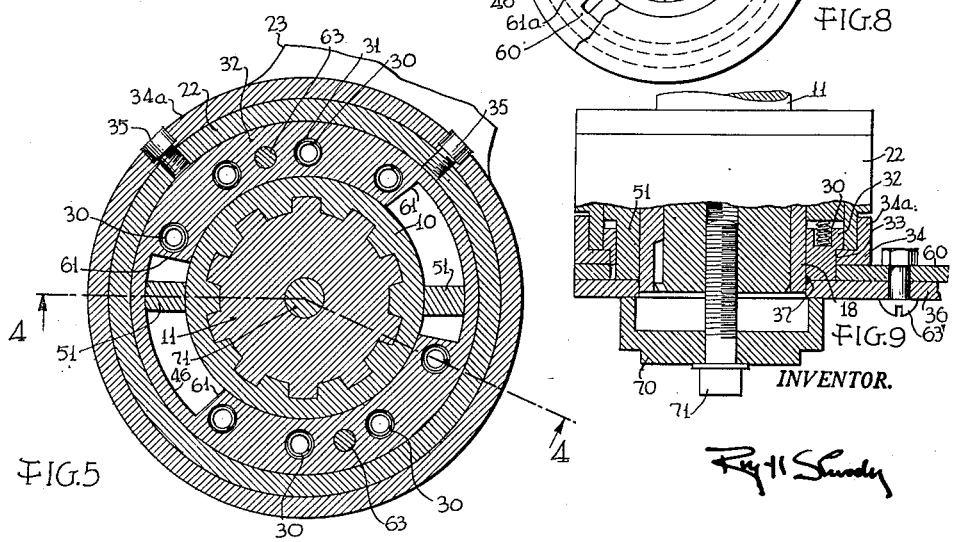
INVENTOR.

United States Patent Office 2,697,497
Patented Dec. 21, 1954

2,697,497

BRAKE ADJUSTING APPARATUS

Roy H. Shively, Scranton, Pa.; Annette L. Shively, administratrix of said Roy H. Shively, deceased.

Application May 6, 1950, Serial No. 160,512

8 Claims. (Cl. 188—196)

This invention relates to brake adjusting apparatus and has for an object the provision of improvements in this art.

One of the particular objects of the invention is the provision of a brake operating and adjusting assembly which can be readily assembled from the accessible end of a brake operating cam shaft, the parts of the assembly being so formed that there is little possibility that they will come apart or require attention after being assembled on the cam shaft.

Another object is to provide improved means for adjusting for different lengths of power brake-actuating strokes.

Another object is to provide improved means for releasing and re-setting the parts, as for example, when the brakes have been re-lined or have over-run their position.

Another object is to provide apparatus having simple, sturdy and dependable parts and which is not likely to give improper operation or get out of order.

The above and other objects and features of the invention will be apparent from the following description of an exemplary embodiment, reference being made to the accompanying drawings, wherein:

Fig. 1 is an end elevation of the cam shaft and the related operating and adjusting means, the view also showing part of the brake shoes and drum;

Fig. 2 is a perspective view of the brake cam shaft operating and adjusting device alone;

Fig. 3 is an end elevation with the cover plate removed;

Fig. 4 is an axial section taken on the line 4—4 of Fig. 5;

Fig. 5 is a transverse section taken on the line 5—5 of Fig. 4;

Fig. 6 is an axial section and inside view, showing how the parts are moved axially with the casing for re-setting;

Fig. 7 is a partial section taken on the line 7—7 of Fig. 3;

Fig. 8 is an end elevation of a modification in which the throw adjustment means is located externally; and Fig. 9 is a partial axial section taken on the line 9—9 of Fig. 8 but including the securing cap and showing it reversed, as in Fig. 6, to release parts for re-setting.

The brake operating and adjusting apparatus is made as a self-contained unit which can be assembled by pushing it upon and securing it on a brake cam shaft and connecting it to operating and holding elements. It comprises a ratchet gear hub 10 splined on the inside surface to fit on the splined portion of a brake cam shaft 11 having a brake operating cam 12.

At its outer end (the end away from the accessible end) the hub 10 is provided with a ratchet gear drum 14, the drum and hub preferably being made integral or permanently secured together. At its outer end or side the drum 14 is provided with an annular set of operating ratchet teeth 15 and on the other or inner end or side is provided with an annular set of adjusting ratchet teeth 16. On the inner side of the gear drum 14 the hub 10 provides a hub extension 18 to furnish an outer bearing surface for operating parts. At the other or outer side of the drum the cam shaft itself or a sleeve carried thereby furnishes the outer bearing surface for operating parts.

On the outer end adjacent the side of the drum carrying the operating teeth 15, a set of operating pawl teeth 20 is provided, the teeth being carried by an operating pawl ring 21 which fits rotatably on the cam shaft. It need not actually bear on the cam shaft because it is carried by another part which is rotatably supported on the cam shaft. The ring 21 is carried by an open-ended casing 22 which is provided with an operating arm 23 adapted to be connected to an actuating rod 24, as of a power motor 25. The ring 21 may be screwed into the casing 22 and locked or may be press-fitted into the bore 26 thereof and may be further secured by screws or by welding. It is shown to be welded at spots 27. The securement is such that the ring substantially becomes a part of the casing in that it will never in use move out of position relative to the casing.

On the inner side of the ratchet drum there is provided an adjusting pawl ring 28 carrying an annular set of teeth 45 meshing with the adjusting teeth 16 of the drum. The ring 28 fits rotatably on the hub extension 18 and within the bore 26 of the casing. On its inner side the adjusting pawl ring 28 is provided with one or more (here two) axially extending operating studs 51. It is pressed into tooth-engaging position by a plurality of compression springs 30, eight being shown.

The ends of the springs slide on the face of the ring 28 and at their outer ends fit into sockets 31 of an anchor ring 32 which fits rotatably on the hub extension 18 and within the bore 26.

The operating studs 51 have movement within slots or recesses 46 provided with end abutments 61 in the anchor ring 32 which limit the movement of the studs 51. The anchor ring 32 has a hub 33 of reduced diameter extending out of the casing 22, and a casing closing plate 34, having relative rotation on the hub 33, is removably held on the end of the casing, as by screws 35, the screws being radially aligned in holes formed in a return flange 34a of the plate 34, which flange fits in a reduced portion of the casing, and the screws preferably entering sockets in the casing.

If desired, the ring may be threaded on the casing and may be spot-welded in places to the casing to assure that it will hold its position under all conditions. To the end of the ring hub 33 there is secured an anchor arm 36.

At its outer portion the anchor arm 36 is provided with one or more holes 38 by which it may be secured to a fixed part, as by a bolt 39.

Means are provided for adjusting for different lengths of power strokes for different brakes, the means here shown comprising supplementary abutment stops 61a having adjustment within the arcuate distance between the end abutments 61 of the slots 46 of the anchor ring 32.

In one form illustrated the ring 32 is adjustably secured to the anchor arm 36 by screws 63 passing through slots 62 of the arm and threaded in the anchor ring 32.

A cover plate 64 closes the slots over the ends of the studs 51, the plate conveniently being held by the adjustment screws 63. In Fig. 3 roughened sleeves 65 are shown on the screws 63 within the roughened sides of the slots 62. These sleeves hold the parts very securely in place but must be lifted out for making a shift in position and this requires removing the plate 64. If the sleeves 65 are not used the screws 63 will alone hold for all normal service and it will not be necessary to remove the plate 64 to make adjustments.

In another form, that shown in Figs. 8 and 9, the anchor ring 32 and anchor arm 36 are rigidly secured together, as by screws or welding 37, and a supplemental arm element 60 is provided on the hub 33, the supplemental arm having abutment stop fingers 61a' adjustable in the slots 46, and having adjustment relative to the anchor ring and arm, as by a slot 62' and screws 63'.

A closing plate 58 is secured to the end of the casing over the operating pawl ring 21, as by screws 59. The plate has a bearing fit on the cam shaft 11.

The entire casing may be held on the cam shaft 11 by a cap plate 70 engaging the end of hub 18 and a cap screw 71 holding the plate 70 on the end of the cam shaft.

All teeth are undercut below the tip, being about 2 degrees or slightly more from a line normal to the surface, so as to lock when the teeth are pushed together.

In operation, the power motor 25 moves the actuating rod 24 outward each time the brakes are applied. It is returned by springs. The cam shaft itself is returned by spring action on the brake shoe holders. The arm 23 is moved back and forth by the rod 24, first applying and then releasing the brakes. The arm 23 carries the casing 22 and that carries the operating pawl 21, the teeth 20 of which engage the teeth 15 of the ratchet gear drum and turn it. This turns the cam shaft and applies the brakes. At this time the anchor arm 36 is held stationary, holding with it the anchor ring 32. The studs 51 move in the overlapping slots 46 of the anchor ring 32 and 62 of arm 36 between the ends or abutments 61, 61a, the setting at slot 62 of screw 63 determining the length between abutments 61 and 61a.

After the studs 51 have moved the free length between abutments they are stopped, stopping the adjustment pawl ring 28 on which they are carried. Continued movement of ratchet gear drum 14 then causes the teeth 16 and 45 to ride up on each other, the ring 28 pushing against springs 30. If the movement is sufficient the teeth 16 and 45 will ride completely over each other and when the brakes are released the drum 14 is held against return. The operating pawl when moved back will then jump over a tooth distance relative to the drum. At the next operation the brake is applied more firmly. On this return movement of the operating pawl ring the casing 22 moves axially relative to the cam shaft to allow the teeth to pass over each other. The movement, however, is less than double tooth depth to avoid unauthorized movements.

Fig. 6 shows how the cap plate 70 is taken off and reversed to press the casing endwise for re-setting, the anchor arm being released at this time (by disconnection) to permit the necessary movements.

The action of the modified device of Figs. 8 and 9 is the same as the other, the specific structure only being different. The main difference is that the abutment projections 61a' extend into the slots 46 from the outer side whereas in the first form the overlap of superposed arcuate slots determined the amount of free movement of the studs 51. Also in Figs. 8 and 9 the adjusting slot 62' is placed outward along the anchor arm for greater accessibility.

While certain embodiments of the invention have been illustrated and described by way of example, it is to be understood that there may be various embodiments within the general scope of the invention.

What is claimed is:

1. Brake adjusting apparatus comprising in combination, a casing turnable about a brake cam shaft, a toothed ratchet gear on said cam shaft, an operating pawl carried by said casing and cooperating with the teeth on said ratchet gear to turn it for brake application when the casing is turned, an adjusting pawl carried by said casing and having limited circumferential movement with said ratchet gear, said adjusting pawl having teeth cooperating with teeth on said ratchet gear, a striker element projecting axially from said adjusting pawl, and circumferentially spaced abutment elements adapted to cooperate with said striker element to determine the arcuate extent of circumferential movement of said striker element, said abutment elements being carried each by one of two abutment adjusting members having circumferential adjusting movement relative to each other, means for securing said abutment adjusting members together in a selected adjusted position, one of said abutment adjusting members being constituted as a fixed part assembled with and relative to which the casing has turning movement, the adjustment of said abutment elements providing an effective arcuate slot for the movement of said striker element to provide for brake operating strokes of different length.

2. Brake adjusting apparatus comprising in combination, a casing turnable about a brake cam shaft, a ratchet gear within the casing mounted on the cam shaft for turning it, an operating pawl carried by said casing for turning the ratchet gear in one direction, an adjustment pawl member carried by said casing and cooperating with said ratchet gear to hold it in turned positions, a fixed anchor member assembled with said casing, rotation limiting means between said adjustment pawl member and said fixed anchor member, said rotation limiting means including a pin and slot on respective members, and means associated with and mounted on one of said members for varying the effective length of movement between said pin and slot, said last-mentioned means comprising a supplemental part mounted on one of said members and having circumferential adjusting movement relative to a part of the member on which it is mounted, and means for securing said parts together in adjusted positions, the adjustment in the effective length of movement in said slot providing for brake operating strokes of different length.

3. Brake adjusting apparatus comprising in combination, a casing turnable about a brake cam shaft, an annular operating pawl carried rigidly within said casing and having an annular set of end teeth, a ratchet gear fast on the cam shaft within the casing and having an annular set of end teeth on each end face, an annular adjusting pawl having end teeth meshing with a set of teeth on the ratchet gear, said adjusting pawl being mounted for turning movement and also for axial movement relative to both said casing and said ratchet gear, axial projections on said adjusting pawl, a circumferentially fixed anchor ring retainably held for axial rotation with said casing, arcuate slots of limited length in said anchor ring for said end projections, an adjustable member mounted for circumferential adjusting movement upon and relative to said anchor ring and having elements defining in part the effective length of said arcuate slots, and means for securing said adjustable member in selected adjusted positions on said anchor ring.

4. Brake adjusting apparatus as set forth in claim 3, further characterized by the fact that said adjustable member comprises a turnable plate having arcuate slots with circumferential end stop elements overlying and adjustable relative to the slots of said anchor ring.

5. Brake adjusting apparatus as set forth in claim 3, further characterized by the fact that said adjustable member comprises a turnable plate having a finger extending into an arcuate slot of said anchor ring.

6. Brake adjusting apparatus as set forth in claim 3, further characterized by the fact that said adjustable member comprises a turnable plate having an element for varying the effective length of a slot in the anchor ring and having a slot and screw connection with the anchor ring for holding it in various adjusted positions.

7. Brake adjusting apparatus comprising in combination, a casing turnable on a brake cam shaft, an operating pawl with an annular set of end teeth fixed in one end of said casing, an end cap on said casing over the outer end of said operating pawl and having a turnable bearing fit on the cam shaft, a ratchet gear within said casing fast on the cam shaft, said ratchet gear having a hub extending out of the end of the casing opposite the operating pawl, said ratchet gear having a drum with an annular series of ratchet teeth on each end, an adjustment pawl ring mounted on said hub within said casing and having teeth meshing with one set of teeth on said drum, axially projecting studs on said adjustment pawl ring, an anchor ring mounted on said hub within said casing and having arcuate slots receiving said projections, a ring on said casing retaining said anchor ring, springs urging said adjustment pawl away from said anchor ring, an anchor arm outside said casing secured for arcuate adjustment to the outer end of said anchor ring, said anchor arm having arcuate slots overlying the arcuate slots in said anchor ring and receiving the ends of said studs, means for securing said anchor ring and anchor arm together in adjusted positions, and a cover plate secured over the slotted portion of said anchor arm.

8. Brake adjusting apparatus comprising in combination, a ratchet gear fast on a brake cam shaft, ratchet teeth on each face of said ratchet gear, an operating casing mounted for rotative and axial movement on the cam shaft and enclosing the ratchet gear, operating and adjustment pawl rings mounted within said casing and having teeth meshing respectively with the teeth on opposite faces of said ratchet gear, one of said pawl rings being made fast to said casing to move both circumferentially and axially with it, spring means pressing the second pawl ring against the teeth on the other face of said ratchet gear, an anchor ring in said casing, rotation limiting means between said anchor ring and the adjacent pawl ring, and an abutment ring adjustably secured in the assembly relative to said anchor ring and having circumferentially shiftable abutment means for varying the effective amount of turning movement between said anchor ring and the adjacent pawl ring and means for holding the abutment ring and anchor ring securely together in adjusted positions, the casing when moved endwise moving the pawl ring secured to it endwise and when moved sufficiently causing the teeth of this pawl ring to separate from the teeth of the ratchet gear to permit re-setting of the device.

References Cited in the file of this patent

UNITED STATES PATENTS

| Number | Name | Date |
|---|---|---|
| 2,030,848 | Boughton et al. | Feb. 18, 1936 |
| 2,109,637 | Gutkaiss | Mar. 1, 1938 |
| 2,379,796 | Freeman et al. | July 3, 1945 |
| 2,481,319 | MacDougall | Sept. 6, 1949 |
| 2,522,903 | Shively | Sept. 19, 1950 |